(12) United States Patent
Hinde

(10) Patent No.: US 6,483,441 B1
(45) Date of Patent: Nov. 19, 2002

(54) DISTANCE INDICATING DEVICE AND METHOD

(76) Inventor: Thomas F. Hinde, 1010 Crowder Ct., Fort Wayne, IN (US) 46825

( * ) Notice: Subject to any disclaimer, the term of this patent is extended or adjusted under 35 U.S.C. 154(b) by 0 days.

(21) Appl. No.: 08/922,161

(22) Filed: Sep. 2, 1997

(51) Int. Cl.[7] .................................................. B60Q 1/48
(52) U.S. Cl. ..................... 340/932.2; 340/903; 340/435
(58) Field of Search ............................... 340/932.2, 903, 340/435, 458; 356/623, 5.01; 250/573; 33/264, 286

(56) References Cited

U.S. PATENT DOCUMENTS

| | | | |
|---|---|---|---|
| 2,317,652 A | * 4/1943 | Toney | 340/932.2 |
| 4,737,001 A | * 4/1988 | Moss | 340/435 |
| 4,916,445 A | * 4/1990 | Crossley | 340/961 |
| 4,941,263 A | * 7/1990 | Hirshberg | 340/435 |
| 5,432,509 A | * 7/1995 | Kajiwara | 340/903 |
| 5,701,122 A | * 12/1997 | Canedy | 340/932.2 |
| 5,724,141 A | * 3/1998 | Nishino | 340/903 |

FOREIGN PATENT DOCUMENTS

| | | | | |
|---|---|---|---|---|
| DE | 3340687 | * | 5/1985 | 340/932.2 |
| DE | 4306419 | * | 9/1994 | 340/932.2 |

* cited by examiner

Primary Examiner—Brent A. Swarthout
(74) Attorney, Agent, or Firm—Lundy and Associates

(57) ABSTRACT

A distance indicating device having at least one energy wave generator. Each of the generators have a focusing device to produce a directional focused beam of wave energy. Each of the wave generators have a means for mounting the generator to a vehicle and a means for adjustively positioning the generator to intersect or impact an object at a predetermined distance from the generator or the vehicle on which it is mounted utilizing the point of intersection or impact to determine the distance between the vehicle and a fixed object.

An improved method for indicating the distance between a vehicle and a fixed object is also provided utilizing the focused energy wave beam generators of the improved distance indicating device of the invention.

24 Claims, 5 Drawing Sheets

DISTANCE INDICATING DEVICE AND METHOD

BACKGROUND OF THE INVENTION

The present invention relates to distance indicating devices and methods, and more particularly to such a method and device for mounting on a vehicle for easy determination of the distance between an object and the vehicle when maneuvering or parking the vehicle. Ever since automobiles have become common place and are parked in garages, everyone has experienced the difficulty of positioning an automobile in a garage without contacting one of the garage walls or an item stored in the garage. Parking airplanes in hangers and attempting to gauge the side by side parking of other vehicles without either vehicle to vehicle contact or vehicle to stationary object contact have frustrated many over the years. Thus it is highly desirable to provide an improved distance indicating device and method. It is also highly desirable to provide an improved distance indicating method and device which would mount on a vehicle to indicate predetermined distances from the vehicle and other stationary objects when maneuvering the vehicle.

Various structures have been proposed in indicating distances between a moving vehicle and a stationary object. Lights, hanging objects, painted lines have all been utilized to guide vehicles into a proper position with regard to adjacent stationary objects. Aircraft are guided into loading bays by lights at which the nose is pointed. Automobile owners have hung from the ceiling small balls or other objects which are aligned with the hood ornament to position the automobile in spaced alignment from stationary objects. Each of these devices have failed in one or more instances and are deficient in operational characteristics, primarily because these objects are attached or secured or mounted on stationary objects surrounding the position at which the vehicle is desired to be located. Thus it is also highly desirable to provide an improved distance indicating method and device which can be attached to the vehicle to position the vehicle optimally from stationary objects.

While spacing automobiles from curbs have been desirably accomplished using curb feelers or flexible wire objects extending from a vehicle to scrape against a curb indicating that the vehicle is correctly positioned with respect to the curb, these devices extend from the car, are relatively unsightly, and often break due to repetitive flexing or impact. Thus it is highly desirable to provide an improved distance indicating method and device for a vehicle which has no structure extending from the vehicle subject to breakage or which is esthetically unpleasant.

While radar technology, sonar technology and laser technology all are well known and used to determine distances between objects and devices without extending between the objects, little of this technology has been utilized in distance indicating devices for use on vehicles both because of the difficulty in utilizing this technology and the expense involved. Thus it is highly desirable to provide an improved distance indicating method and device for vehicles which has all of the aspects of radar, sonar and laser technology but which can be utilized on vehicles relatively easily and inexpensively to indicate distances between the vehicle and fixed objects.

Distance indicating devices utilizing energy wave generators that produce directional focused beams of wave energy are most useful for this purpose. Some of these energy wave generators have become relatively inexpensive and are now available for such use. Thus it is also highly desirable to provide an improved distance indicating method and device for vehicles utilizing conventional wave energy generators and focusing mechanisms to produce directionally focused beams of wave energy to determine the distance between a vehicle and stationary objects. Thus it is also highly desirable to provide an improved distance indicating method and device including conventional wave generators to impinge on or reflect from stationary objects thereby to indicate the distance therefrom.

It is also highly desirable to provide an improved wave generator which cooperate with existing features of known vehicles.

It is also highly desirable to provide improved distance indicating method and devices which are mechanically simple, require little or no maintenance, and are relatively inexpensive.

Finally it is highly desirable to provide an improved distance indicating method and device having all of the above identified features.

SUMMARY OF THE INVENTION

It is therefore an object of the invention to provide an improved distance indicating method and device.

It is also an object of the invention to provide and improved distance indicating device which can be mounted on vehicles to indicate predetermined distances from the vehicle and other stationary objects when maneuvering the vehicle.

It is also an object of the invention to provide an improved distance indicating method and device which can be attached to the vehicle to position the vehicle optimally from stationary objects.

It is also an object of the invention to provide an improved distance indicating method and device for vehicles which has no structure extending from the vehicle subject to breakage or which is esthetically unpleasant.

It is also an object of the invention to provide an improved distance indicating method and device which has all of the advantages of radar, sonar and laser technology, but which can be utilized on vehicles relatively easily and inexpensively to indicate distances between the vehicle and fixed objects.

It is also an object of the invention to provide an improved distance indicating method and device for vehicles utilizing conventional wave energy generators and focusing mechanisms to produce directionally focused beams of wave energy in determining the distance between a vehicle and stationary objects.

It is also an object of the invention to provide an improved distance indicating method and device including conventional wave generators which impinge on or reflect from stationary objects thereby to indicate the distance therefrom.

It is also an object of the invention to provide an improved wave generator which cooperate with existing features of known vehicles.

It is also an object of the invention to provide improved distance indicating method and devices which are mechanically simple, require little or no maintenance, and are relatively inexpensive.

It is finally an object of the invention to provide an improved distance indicating method and device having all of the above identified features.

In the broader aspects of the invention there is provided a distance indicating device having at least one energy wave generator. Each of the generators have a focusing device to produce a directional focused beam of wave energy. Each of the wave generators have a means for mounting the generator to a vehicle and a means for adjustably positioning the generator to intersect or impact an object at a predetermined distance from the generator or the vehicle on which it is mounted utilizing the point of intersection or impact to determine the distance between the vehicle and a fixed object.

An improved method for indicating the distance between a vehicle and a fixed object is also provided utilizing the focused energy wave beam generators of the improved distance indicating device of the invention.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
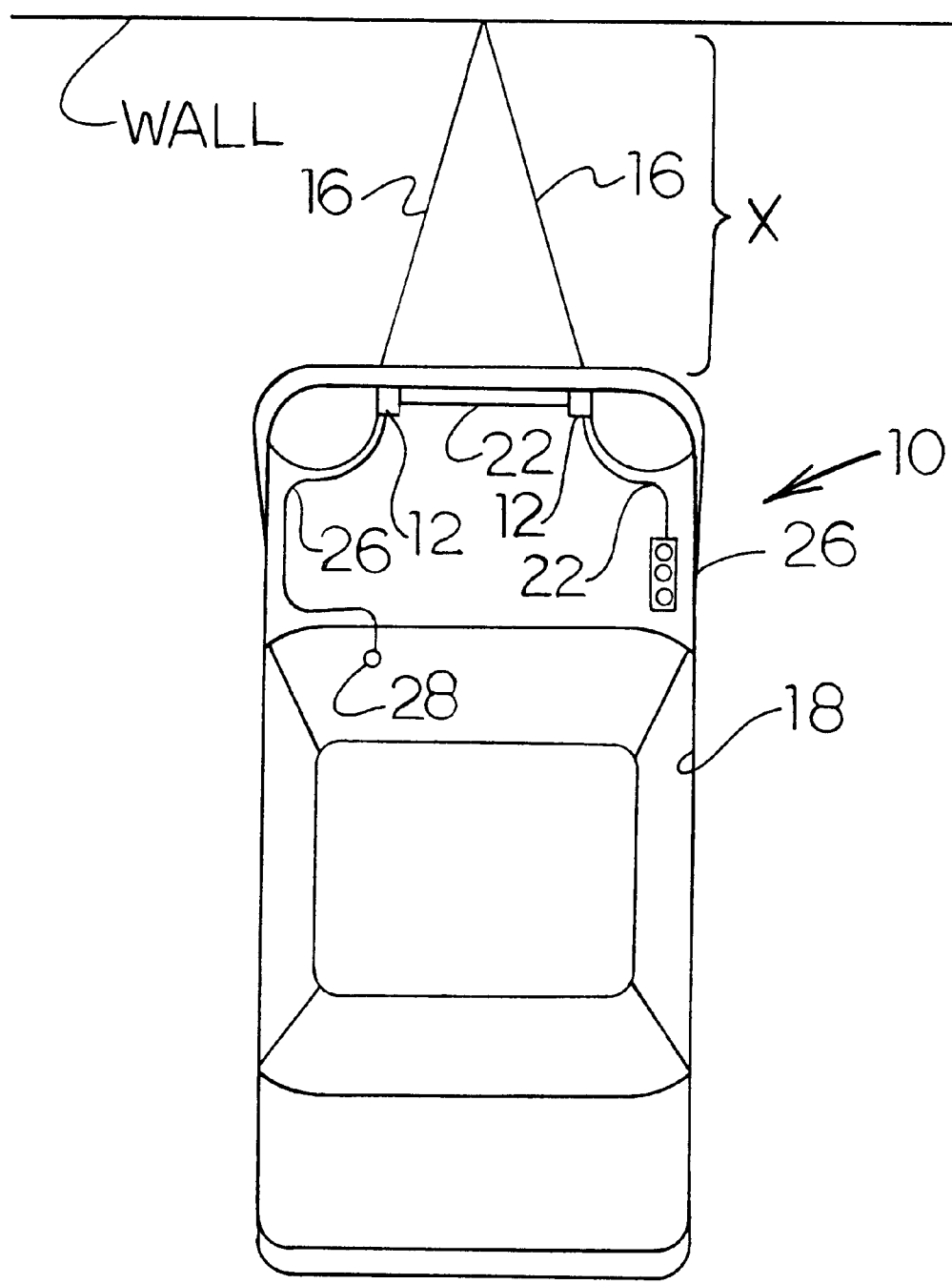
FIG. 1 is a diagrammatic view of a vehicle having the improved distance indicating device mounted thereon.
Figure 2:
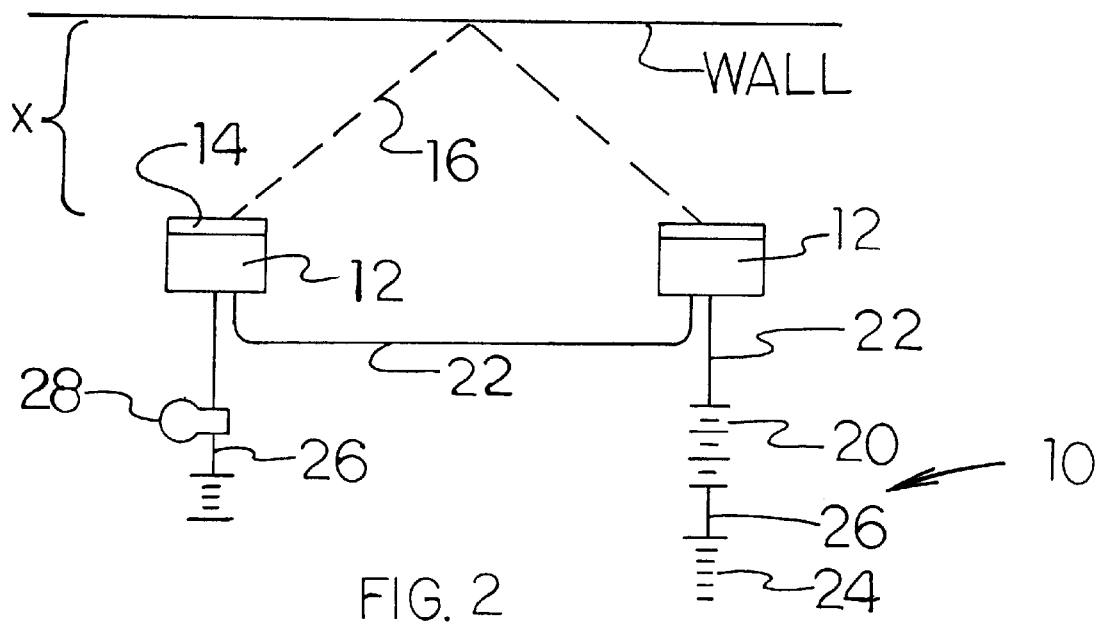
FIG. 2 is a schematic diagram of the improved distance indicating device of the invention using an energy wave beam device.

The improved distance indicating device of the invention 10 is shown in FIGS. 1 and 2 to include two energy wave generators 12 each of the generators have a focusing device 14 to produce a directional focused beam 16 of wave energy. The generators are shown mounted to an vehicle 18 at the front such that the energy wave beam 16 passes through the grill outwardly of the vehicle, but may be mounted to the sides and rear of a vehicle 18 behind a decorative lens or grill as desired. The means by which the generators 12 are mounted to the automobile allows for aiming the beams 16 such that they intersect at a predetermined distance X from the automobile. In a specific embodiment, these mounting means may be similar to the means by which conventional head lights are mounted to automobiles. While vehicle 18 is illustrated as an automobile, it should be fully understood that vehicle 18 could be any type of vehicle such as an airplane, a boat, or any other vehicle that is routinely docked, parked or stored adjacent to other structures in which the distance between those structures and the vehicle is critical to efficiently use space and the desire not to engage the vehicle with those structures.

The generators 12 are interconnected to the automobile battery 20 through electrical leads 22 and to ground 24 through electrical leads 26. In the electrical leads 26 between the generators 12 and ground 24 is an indicator 28 which illuminates whenever the device is activated; shown to be a lamp positioned on the dash.

In specific embodiments, generators 12 may be wave energy generators including light generators including, lasers, sound generators including sonar, and energy wave generators out of the hearing and visual spectrum such as radar and the like.

Figure 3:
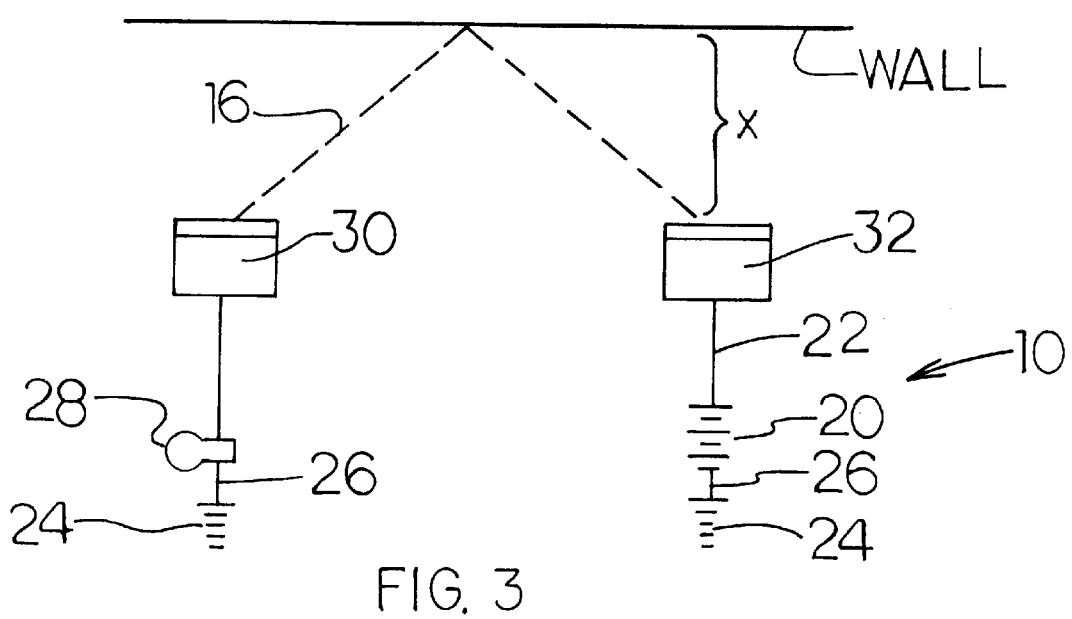
FIG. 3 is a schematic diagram like FIG. 2 of a light or laser beam device.

Referring to FIG. 3, a modified version is shown in which there is a single energy wave generator 12 in the form of a laser 32 which directs a light beam 16 outwardly of the vehicle. On the other side of the car there is light receptor cell 30 which receives the reflected laser 32 and actuates indicator 28 whenever cell 30 receives sufficient reflected laser light. The generator and cell are aimed such that reflected laser light is received by cell 30 when the generator 12 and the reflector 30 are spaced from a reflective object a predetermined distance X away.

Figure 4:
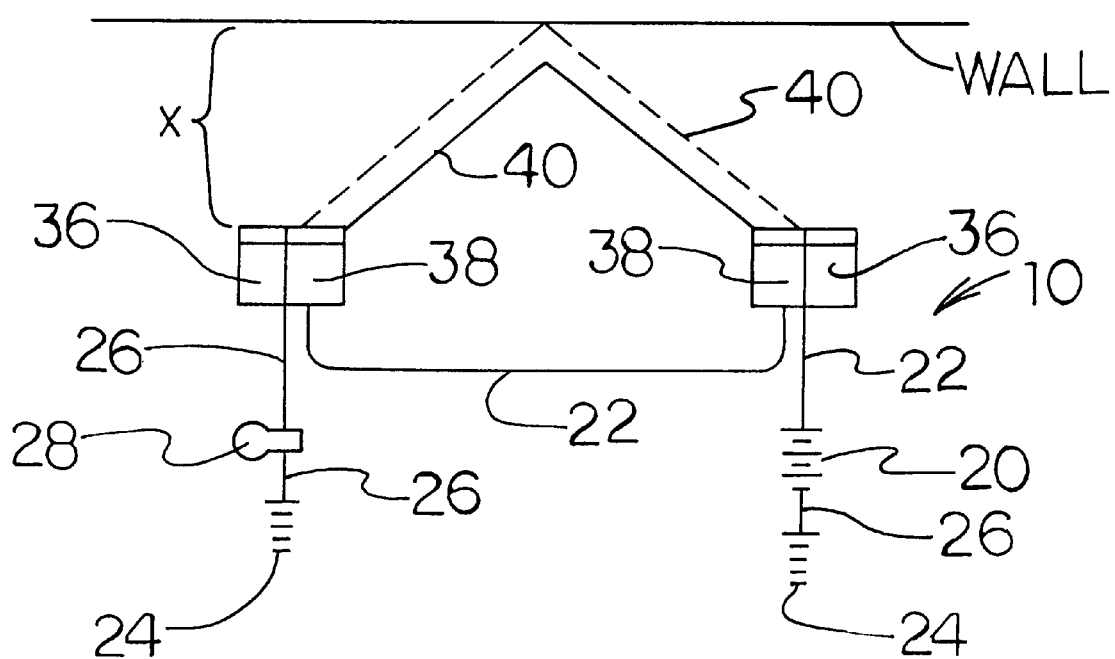
FIG. 4 is a schematic diagram like FIG. 2 of a radar device.

Referring to FIG. 4 another version of the improved distance indicating device of the invention 10 is shown. Here a generator 12 is a radar generator or emitter 36 and a radar receptor 38 which generates a radar beam 40 outwardly of the vehicle. Whenever the radar beam 40 is detected by the receptor 38, indicator 28 is actuated. In the particular embodiment illustrated, generator 36 and receptors 38 are mounted side by side both on the left hand side and the right hand side of the vehicle. Thus, indicator 28 will be actuated if either of the beams 40 are reflected from the object, X distance away.

Figure 5:
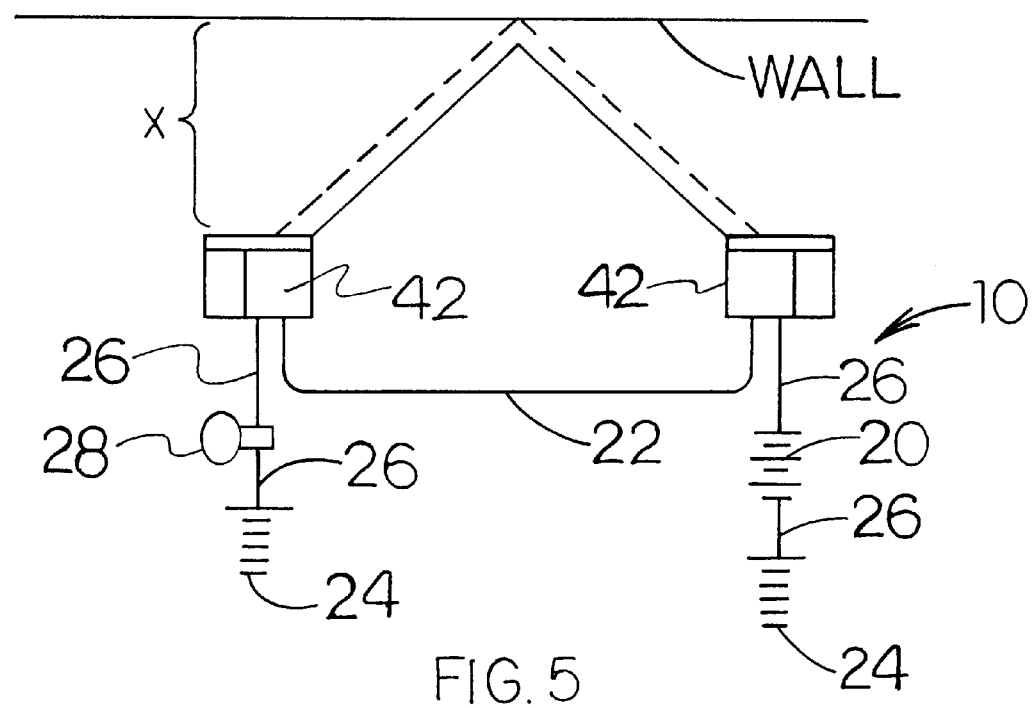
FIG. 5 is a schematic diagram like FIG. 2 of a sound beam device.

Referring now to FIG. 5, there is shown still another version of the improved distance indicating device of the invention utilizing sound waves. In this version, generator 12 is a sound emitter and a sound receptor 42 is a sound speaker and microphone. This version is otherwise structured and functions like the version shown in FIG. 4.

Figure 6:
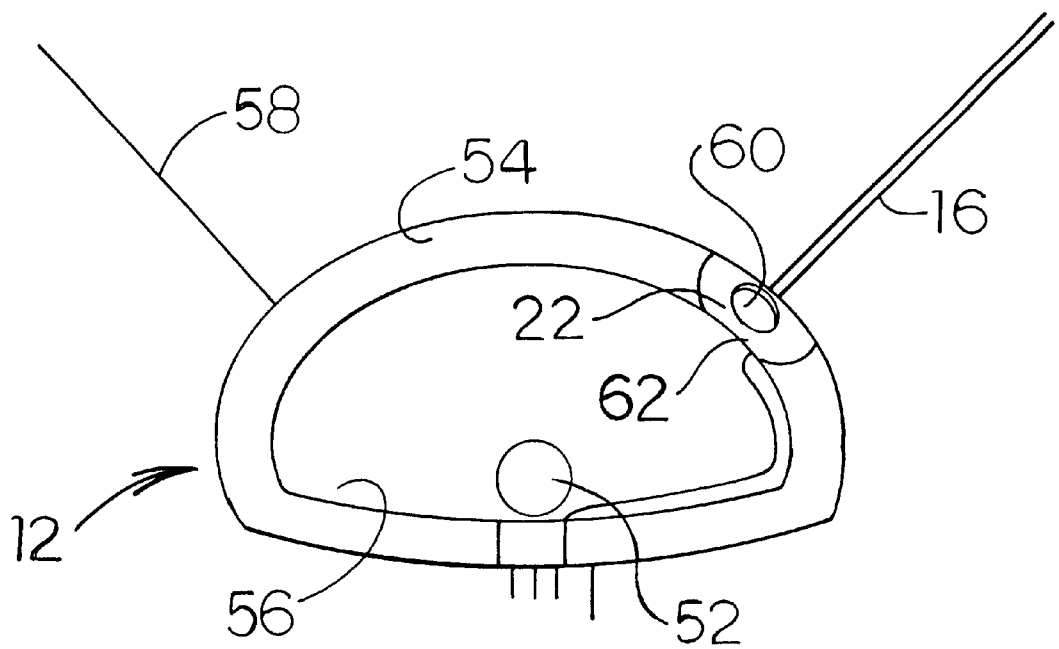
FIG. 6 is a cross-sectional view of an automobile head lamp incorporating the improved vehicle distance indicating device using intersecting focused light beams and the structure illustrated in FIGS. 1 and 2.

Referring to FIG. 6, the generator 12 is shown in the form of a lamp 50. In this version, lamp 50 is mounted and aimed as a conventional automobile head lamp. The head lamp has a filament 52, a lens 54, and a reflector 56 which directs a beam 58 from the lamp. In the lens 60 is a lens system 58 which takes a portion of the light from filament 52 and focuses the same into a small beam 16. In a specific embodiment, the lens 60 is monochromatic such that the beam 16 is colored and is more easily visible both during the night and during the day and is easily distinguishable from the headlight beam 58.

Surrounding the lens system 60 is a light receptor cell 62 which is connected to the vehicle electrical system as shown in FIG. 2 via a lead 22. Lamp 50 shown in FIG. 6 is configured for the left side of a vehicle. A lamp 50 having the same structure, but being the mirror image of lamp 50 as shown in FIG. 6 is paired with lamp 50 for use on the right side of the vehicle. The monochromatic beams 16 intersect and function as above described with regard to FIG. 2 when the head lamps are properly mounted.

Figure 7:
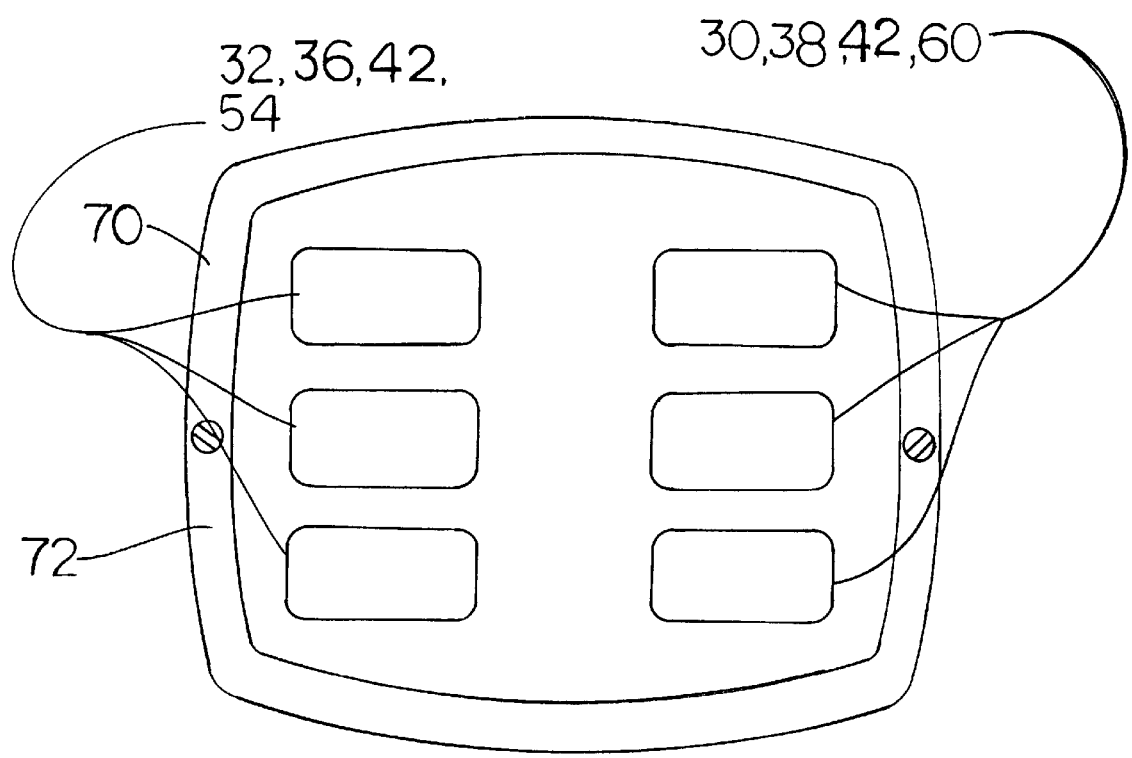
FIG. 7 is a view of a modified version of the improved vehicle distance indicating device of the invention using multiple intersecting light beams and the structure illustrated in FIGS. 1 and 2 which can be mounted on either side or either end of a vehicle.
Figure 8:
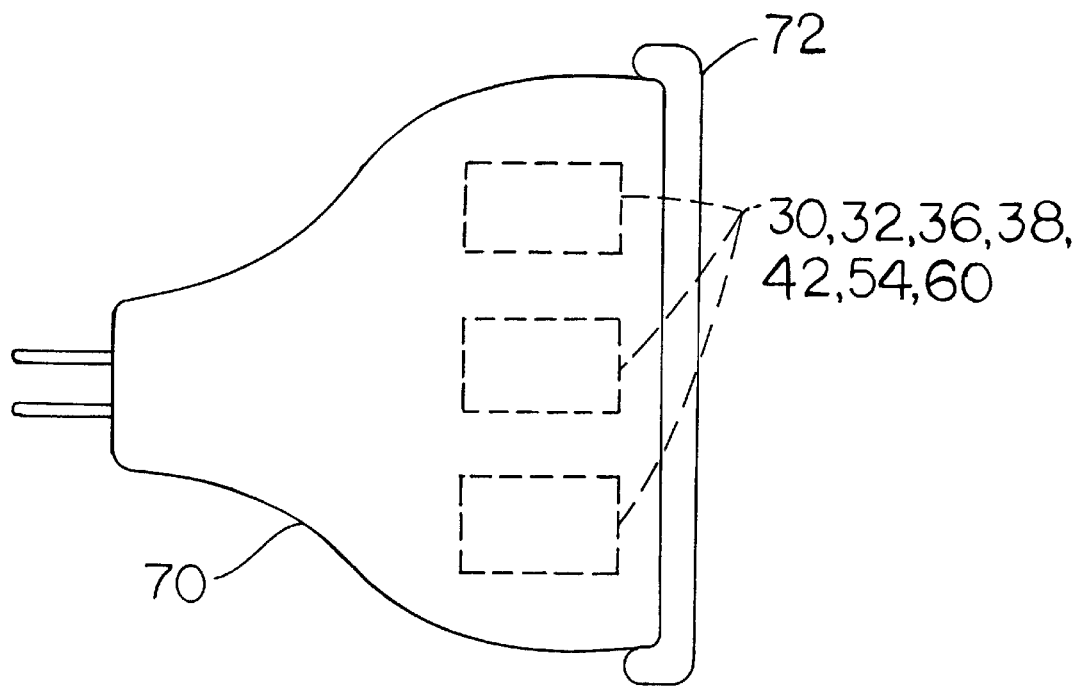
FIG. 8 is a side-view of the device illustrated in FIG. 8.

FIGS. 7 and 8 illustrate still another version having similarities to head lamp 50 which could be mounted in the rear or in the sides of the vehicle or, alternatively to using the lamp 50 illustrated in FIG. 6, in the front of the vehicle in addition to a conventional head lamps to accomplish each of the objects of the invention. The sensor 70 is mounted on a vehicle in much the same way as a conventional head lamp is mounted to an automobile, the vehicle having a recess in which the sensor 70 is positioned. Sensor 70 is held in place flush with the exterior surface of the vehicle by a frame which engages sensor 70 at its periphery and is secured to the vehicle. Sensor 70 has a face which can be either generally rectangular as shown or circular as desired for aesthetic purposes.

Sensor 70 has a plurality of lenses 54 or lasers 32 each of which directs a light beam 16 outwardly thereof. In one embodiment sensor 70 has two rows of lenses 54 or lasers 32 which are arranged in spaced apart rows and to cross at different distances from vehicle 18, for example 1 foot, 5 feet, 10 feet respectively. In another version, lenses 54 or lasers 32 may be aligned in a vertical row 72 on one side of sensor 70. On the other side of sensor 70 are positioned the same number of cells 30 arranged in a vertical row corresponding to each of the lasers 32 or lenses 54 respectively. Preferably, lasers 32 or lenses 54 direct a light beam 16 outwardly of the sensor 70 of a different monochromatic color. This will minimize the interference between the cells 30 which are tailored to receiving a different monochromatic colored reflection. Furthermore, each of the lasers 32 or lenses 54 are directed at slightly different angles outwardly of the vehicle such that in accordance with the description given hereinabove with regard to FIGS. 1 and 2, lasers 32 or lenses 54 for example indicate that the vehicle is 1 foot, 5 feet and 10 feet from adjacent structures, respectively.

In another version, sensor 70 has a single row of systems 60 with lens 54 in the center thereof surrounded by a receptor cell 62 as shown in FIG. 6. In this version, each of these lens systems 60 emanate a focused monochromatic beam 16 outwardly of the vehicle 18 to minimize interference, and each are aimed so as to indicate when the vehicle is 1 foot, 5 feet and 10 feet away from adjacent structures in accordance with the circuitry shown in FIG. 2 respectively.

In still other versions of the sensor 70 illustrated in FIGS. 7 and 8 lasers 32 and the lens systems 60 and 54 may be substituted by radar generators 36 and to function in accordance with the circuitry shown in FIG. 4 or sound emitters and receptors 42 and to function in accordance with the circuitry shown in FIG. 5. Both radar generates 36 and sound emitters and receptors 42 may be provided at different frequencies to correspond to various distances, i.e., 1 foot, 5 feet, and 10 feet respectively and to minimize interference as above described.

In operation, of all of the versions of the improved distance indicating device 10 of the invention, the energy wave generators 12 emanate a focused beam 16 of energy wave outwardly of the vehicle. As the vehicle approaches an object, indicator 28 will indicate to the driver that the vehicle is at the preset distance away from the object whenever the receptors receives sufficient reflected wave energy from the object.

The distance X may be adjusted by adjusting the positional relationships of the energy wave generators 12 on the vehicle and the focusing devices 14 pertaining thereto.

In the versions illustrated in FIGS. 2 and 6 wherein the two energy wave beams 16 intersect in front of the automobile, the driver can visually determine when the vehicle is at distance X away from the stationary object when the intersecting beams appear as a single dot on the object in front of the vehicle. If the vehicle is too close or too far apart, the two beams will not intersect at the object, but will be visible as two dots on the object.

In each of the other versions illustrated in FIGS. 3 and 4, indicator 28 will be actuated whenever the receptors 38, 42 receive the reflected energy waves 16.

The indicators 28 in each of the embodiments may be a light on the dash board, a buzzer, or any other indicator which the owner of the vehicle desires.

The invention provides an improved distance indicating device and such a device that can be mounted on vehicles to indicate predetermined distances from the vehicle and other stationary objects and to position the vehicle optimally from stationary objects. The improved device of the invention has no structure extending from the car subject to breakage or which is esthetically unpleasant. The invention also provides an improved distance indicating device which has all of the aspects of radar, sonar and laser technology, but which can be utilized on vehicles relatively easily and inexpensively to indicate distances between the vehicle and fixed objects utilizing conventional wave energy generators and focusing mechanisms to produce directionally focused beams of wave energy which either impinge on or reflect from stationary objects to indicate when a vehicle is a predetermined distance from an object. The devices of the invention cooperate with existing features of known vehicles and are mechanically simple, require little or no maintenance, and are relatively inexpensive. The invention also provides an improved distance indicating method having all of the above identified features.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto.

What is claimed is:

1. A distance indicating device comprising at least two energy wave generators, each of said generators having a focusing device operatively connected thereto to produce a directional focused beam of wave energy, said focused beams each being at a different frequency whereby said beams are distinguishable one from the other, means for mounting said generators and focusing devices to a vehicle, means for adjustably aiming each of said focused beams of wave energy to intersect a point at a predetermined distance from said generator, said intersect point of each beam being different, whereby placing an intersection point on an object places said vehicle at said predetermined distance associated with said point from said object.

2. The device of claim 1 wherein said generator is chosen from the group of wave energy generators consisting of light generators, laser generators, sound generators, sonar generators, and radar generators.

3. The device of claim 1 further comprising at least two receivers, means for mounting said receivers to a vehicle, means for adjustably positioning said receivers to receive reflective wave energy of said focused beams of wave energy from objects a predetermined distance from said vehicle, respectively.

4. The device of claim 1 further comprising second energy wave generators in the same number as said wave generators, thereby forming at least two pairs of wave generators each having a wave generator and a second wave generator, said second generators having second focusing devices operatively connected thereto to produce second directional focused beams of wave energy, second means for mounting said second generators and second focusing devices to a vehicle, means for selectively aiming said second generators to intersect said focused beams of wave energy from said first generators at a predetermined distance from said generators.

5. The device of claim 4 wherein said generators are chosen from the group of wave energy generators consisting of light generators and laser generators.

6. The device of claim 3 further comprising an indicator coupled to said receivers for indicating reception of a reflected beam of wave energy.

7. The device of claim 6 wherein said means for selectively aiming said generators includes means for adjusting said predetermined distance and actuating said indicators at separately identifiable predetermined distances from said object.

8. The device of claim 6 further comprising an indicator coupled to said means for adjustably positioning said generators so as to continuously indicate the distance of said object from said vehicle.

9. The device of claim 6 wherein said wave energy is radar, said receiver is a radar sensor, and said indicators coupled to said means for adjustably positioning said generators so as to continuously indicate when reflective radar is sensed by said sensor.

10. The device of claim 6 wherein said energy wave is a light wave, said receiver is a light cell, and said indicator is coupled to said means for adjustably positioning said generator so as to indicate receipt by said light cell reflective light from said generator.

11. The device of claim 6 wherein said wave energy is sound, said receiver is a microphone, and said indicator is coupled to said means for adjustably positioning said generator so as to be actuated by said microphone receiving reflective sound from said generator.

12. The device of claim 1 wherein said generator is a vehicle head lamp, said mounting means is a vehicle head lamp mounting means and said means for adjustably aiming said focused beam is the aiming mechanism of said vehicle head lamp mounting means, said focusing device is a supplemental lens in the lens of the head lamp which directs from the head lamp a supplemental beam of light separate from the beam from the head lamp.

13. The device of claim 12 wherein said supplemental lens is monochromatic and said supplemental beam emanating therefrom is colored, the supplemental beam bring easily distinguished from the beam from said head lamp.

14. The device of claim 13 further comprising a second vehicle head lamp and second supplemental lenses, a second means for mounting and a second means for selectively aiming the focused beams from said second supplemental lenses to intersect said first focused beams at predetermined distances from said vehicle, said head lamps being properly aimed to place the intersection of said beams on an object which places said vehicle at said predetermined distances from said object.

15. The device of claim 1 wherein there are a plurality of spaced-apart generators, said generators each being chosen from the group of energy wave generators consisting of radar generators and sound generators, each of said generators being at a different frequency emanating an energy wave beam at a different frequency, said energy wave beams reflecting at different points at different predetermined distances from said vehicle, and further comprising a receiver for each of said generators, and means for adjustably positioning said receivers to receive reflecting wave beams from said generators, respectively.

16. A method for indicating distance between a vehicle and a fixed object comprising generating a first energy wave, focusing said first energy wave, aiming said focused first energy wave outwardly of a vehicle to intersect a first point at a first determined distance from said vehicle, generating a second energy wave at a different frequency from said first energy wave, whereby said energy waves are distinguishable one from the other, focusing said second energy wave, aiming said focused second energy wave outwardly of a vehicle to intersect a second point at a second predetermined distance from said vehicle, whereby positioning the intersect points of said first and second energy waves on an object indicates the positioning of said vehicle at said first and second predetermined distances away from said object, respectively.

17. The method of claim 16 wherein said generating steps are accomplished by use of generators chosen from the group of wave energy generators consisting of light generators and laser generators.

18. The method of claim 16 wherein said generating steps are accomplished by use of vehicle head lamps, each of said vehicle head lamps having supplemental lenses in the lens of the head lamp which focuses the beams from said head lamp into focused supplemental beams and aims said focused supplemental beams from said head lamp separately and apart of said head lamp.

19. The method of claim 16 wherein said supplemental lenses are monochromatic and said supplemental beams emanating therefrom are colored, said supplemental beams being easily distinguishable from the beams from said head lamps and from each other.

20. The method of claim 16 wherein there are a plurality of spaced apart supplemental lenses, each of said supplemental lenses being monochromatic, said supplemental beams emanating therefrom being colored and being differentiated in wave length from each other.

21. The method of claim 16 wherein there are a plurality of spaced-apart pairs of generators, said generators being chosen from the group of energy wave generators consisting of light generators and laser generators, each of said generators being monochromatic, said beams of each pair being of a different color said beams of each pair intersecting at a different point at a different pre-determined distance from said vehicle.

22. The method of claim 16 wherein there are a plurality of spaced-apart generators, said generators being chosen from the group of energy wave generators consisting of radar generators and sound generators, each of said generators generates an energy wave beam of a different frequency, said wave beams reflecting at different points at different pre-determined distances from said vehicle, and further comprising a receiver for each of said generators, and means for adjustably positioning said receivers to receive reflecting energy wave beams from said generators, respectively.

23. A distance indicating device comprising a vehicle head lamp having a lens, providing a beam and at least one supplemental lens within said lens, said supplemental lens generating from said head lamp beam a supplemental focused beam of light distinct from the beam of said lamp, which in combination with a vehicle lamp mounting means and means for adjustably aiming said lamp beam on a vehicle aims said supplemental focused beam to intersect a point at a pre-determined distance from said lamp in accordance with the method of claim 16.

24. The distance indicating device of claim 23 further comprising a second vehicle head lamp having a lens, at least one supplemental lens within said lens, said supplement lens generating from said lamp beam a supplemental focused beam of light distinct from the beam of said lamp, each of said supplemental focused beams of light being distinguishable from each other and aimed to intersect a point at a predetermined distance from said vehicle, said intersect point of each beam being different, whereby placing an intersect point on an object places said vehicle at said predetermined distance associated with said intersect point from said object.

* * * * *